(12) United States Patent
Zhang

(10) Patent No.: US 7,481,969 B2
(45) Date of Patent: Jan. 27, 2009

(54) POWDERED METAL MAGNETIC FILTER AND METHOD FOR MANUFACTURING SAME

(75) Inventor: Shun X. Zhang, Canton, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 270 days.

(21) Appl. No.: 11/263,244

(22) Filed: Oct. 31, 2005

(65) Prior Publication Data
US 2007/0095738 A1     May 3, 2007

(51) Int. Cl.
*B01D 35/06* (2006.01)
*B22F 3/115* (2006.01)

(52) U.S. Cl. .................. 419/2; 210/696; 210/222; 210/500.25; 210/510.1; 29/896.2

(58) Field of Classification Search ............. 210/695, 210/222, 223, 496, 500.25, 510.1; 419/2; 29/896.62; 264/603
See application file for complete search history.

(56) References Cited

U.S. PATENT DOCUMENTS

| | | | | |
|---|---|---|---|---|
| 2,157,596 A | * | 5/1939 | Davis ............................ | 419/2 |
| 3,746,642 A | * | 7/1973 | Bergstrom .................. | 210/496 |
| 6,461,562 B1 | * | 10/2002 | Solntsev et al. ............. | 264/646 |

* cited by examiner

*Primary Examiner*—David A Reifsnyder

(57) ABSTRACT

The present invention provides a fluid filter comprising a magnetic substrate configured to allow passage of fluid therethrough, with the substrate manufactured from sintered powdered metal. Preferably, the filter has a porosity of at least 10%, and a magnetic flux density of at least 5 gauss. The substrate may include iron, aluminum, barium, cerium, cobalt, chromium, molybdenum, nickel, oxygen, praseodymium, platinum, samarium, and/or strontium. The present invention also provides a method of manufacturing a fluid filter by sintering powdered metal to form a magnetic substrate configured to allow passage of fluid therethrough. The method may further include shaping the magnetic substrate for use within a desired application.

2 Claims, 1 Drawing Sheet

POWDERED METAL MAGNETIC FILTER AND METHOD FOR MANUFACTURING SAME

TECHNICAL FIELD

The present invention relates to a fluid filter manufactured using powdered metal sintering, and a method of manufacture thereof.

BACKGROUND OF THE INVENTION

Fluid filters which separate particulates from a fluid are well known in a wide variety of industries. Traditionally, fluid filters include a polymeric substrate including a plurality of openings. When the fluid passes through the fluid filter, particulates larger than the openings are trapped by the substrate, while the fluid and particulates smaller than the openings pass therethrough. In some fluids, there are ferromagnetic particulates which may be smaller than the openings within a given polymeric substrate, and which therefore will not be trapped as the fluid passes through the filter.

SUMMARY OF THE INVENTION

The present invention provides a fluid filter comprising a magnetic substrate configured to allow passage of fluid therethrough, with the substrate manufactured from sintered powdered metal. Preferably, the filter has a porosity of at least 10%, and a magnetic flux density of at least 5 gauss. The substrate may include iron, aluminum, barium, cerium, cobalt, chromium, molybdenum, nickel, oxygen, praseodymium, platinum, samarium, and/or strontium.

The present invention also provides a method of manufacturing a fluid filter by sintering powdered metal to form a magnetic substrate configured to allow passage of fluid therethrough. The method may further include shaping the magnetic substrate for use within a desired application.

The above features and advantages and other features and advantages of the present invention are readily apparent from the following detailed description of the best modes for carrying out the invention when taken in connection with the accompanying drawing.

DESCRIPTION OF THE PREFERRED EMBODIMENTS

Figure 1:
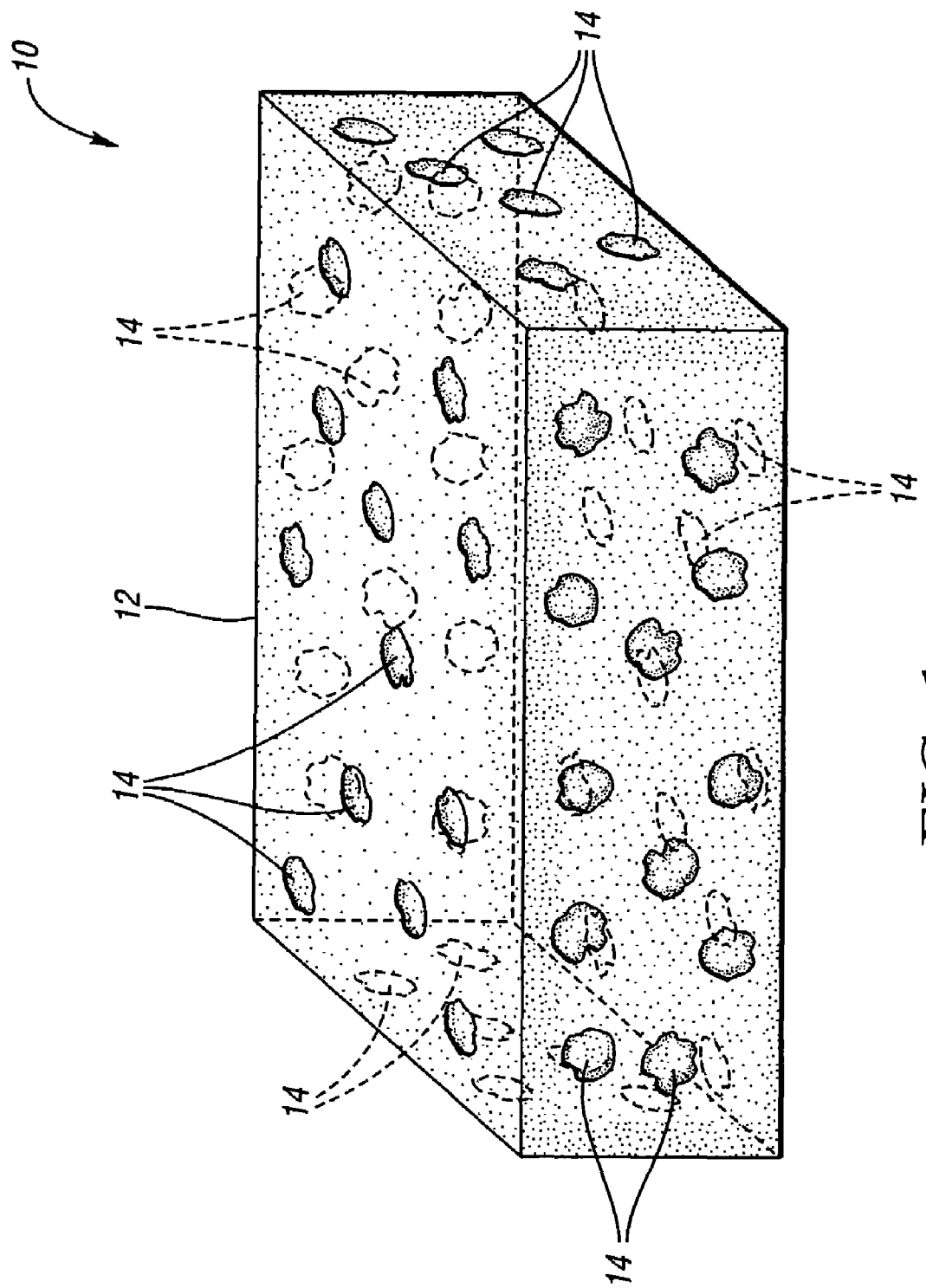
FIG. 1 is a schematic perspective view of a magnetic fluid filter according to the present invention.

Referring to FIG. 1, a magnetic fluid filter 10 includes a substrate 12 with a plurality of openings 14 therethrough. The substrate 12 is manufactured from sintered powder metal to have a magnetic flux, with a magnetic flux density preferably of at least 5 gauss. To form the openings 14, the powdered metal is preferably mixed with organic material and subsequently sintered, with the openings 14 resulting from incineration of the organic material during the sintering process. The openings 14 may or may not extend all the way through the substrate 12. However, the openings 14 are interconnected within the substrate 12, thereby allowing a liquid to travel through the substrate 12. The openings 14 define a substrate porosity, which is preferably at least 10%.

When the fluid passes through the magnetic fluid filter 10, non-ferromagnetic particulates larger than the openings in the substrate 12 contained within the fluid are trapped outside the substrate 12, while the fluid and non-ferromagnetic particulates smaller than the openings pass into the substrate 12 through one or more openings 14. Since the substrate 12 has a magnetic flux, as the liquid travels through the substrate 12, ferromagnetic particulates within the fluid will be attracted to the substrate 12, and consequently separated from the liquid. Any ferromagnetic particulates which are attracted by a material having the magnetic flux density of the substrate 12 will thus attach to the substrate 12 within the openings 14. Thus, the openings 14 must be small enough to restrict entry of non-ferromagnetic particulates as desired (i.e. act as a traditional polymeric filter), but also large enough to allow the fluid to pass therethrough without being impeded by the ferromagnetic particulates throughout the required usage life of the magnetic fluid filter 10. The magnetic fluid filter 10 may be reverse flushable for reuse if desired.

One skilled in the art will recognize that powdered metal having magnetic properties can include one or more of the following: iron, aluminum, barium, cerium, cobalt, chromium, molybdenum, nickel, oxygen, praseodymium, platinum, samarium, and strontium. Additionally, it should be recognized that forming the substrate 12 from sintered powder metal imparts improved stability to the substrate 12 as compared to a similarly sized polymeric substrate. Specifically, the substrate 12 according to the present invention has improved structural stability, especially when the substrate 12 is subjected to pressure spikes or fluctuating stresses; improved chemical stability, with the substrate 12 better able to resist degradation from the fluid passing therethrough; and improved thermal stability, with the magnetic fluid filter 10 operative at temperatures at least as high as 400° C.

It should be noted that FIG. 1 is included by way of example only. One skilled in the art will recognize that a fluid filter of any shape or size could be used to practice the present invention. By way of example, the substrate 12 may be a flat screen in front of a fluid inlet or outlet, or an inlet extension having a tubular or ring form. Additionally, a fluid filter according to the present invention can be used for a multitude of applications. For example, within the automotive industry, a magnetic fluid filter 10 according to the present invention may be particularly useful within a vehicle engine to prevent debris or sediment (i.e. particulates) from entering or re-entering a vehicle lubrication system. As another example from the automotive industry, a magnetic fluid filter 10 according to the present invention may be used within a variable bleed solenoid to control line pressure within a vehicle's automatic transmission. There are numerous uses for a magnetic fluid filter 10 according to the present invention throughout a wide array of industries and arts. To practice the present invention, it matters only that a filter comprise a substrate manufactured from sintered powdered metal to have a magnetic flux and a plurality of openings defining a filter porosity.

The present invention further provides a method of manufacturing a magnetic fluid filter 10 comprising the step of sintering powdered metal to form a magnetic substrate 12 configured to allow passage of fluid therethrough. The method may further include the step of shaping the magnetic substrate 12 for use within a desired application.

While the best mode for carrying out the invention has been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. A method of manufacturing a magnetic fluid filter comprising:

sintering powdered metal mixed with an organic material to form a magnetic fluid filter substrate configured to allow passage of fluid therethrough, wherein said organic material is incinerated during sintering to form a plurality of openings within the magnetic fluid filter substrate, and wherein said magnetic fluid filter substrate includes at least one of iron, aluminum, barium, cerium, cobalt, chromium, molybdenum, nickel, oxygen, praseodymium, platinum, samarium, and strontium.

2. The method of claim 1, further comprising:

shaping said magnetic fluid filter substrate for use within a desired application.

* * * * *